Aug. 18, 1959     T. R. EGAN     2,899,700
SNAP-ON CASTER
Filed March 2, 1956
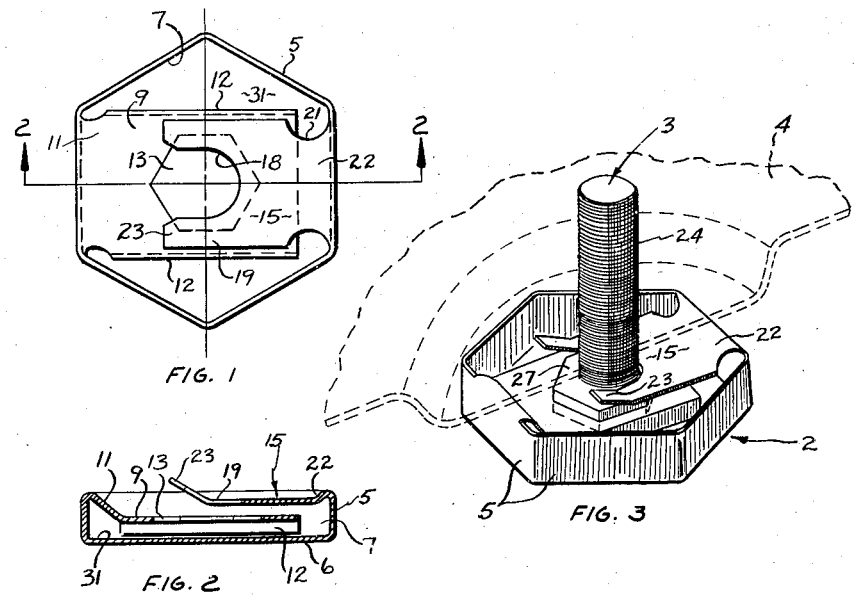
INVENTOR.
THOMAS R. EGAN
BY *J. D. Douglas*
    *His Atty*

United States Patent Office 2,899,700
Patented Aug. 18, 1959

2,899,700

SNAP-ON CASTER

Thomas R. Egan, Galesburg, Ill., assignor to Midwest Manufacturing Corporation, Galesburg, Ill., a corporation of Illinois Application March 2, 1956, Serial No. 569,057

2 Claims. (Cl. 16—30)

This invention relates to adjustable bearing supports, and more particularly to a removable caster for use with an adjustable bolt or like member.

It is customary in the shipment of refrigerators, stoves or other kitchen appliances, to provide a wooden pallet through which cap screws extend into threaded holes in the base or legs of the appliance. When the ultimate consumer receives the appliance the packing, including the pallet are discarded along with the screws that secured the pallet to the legs. It is then customary to insert an adjustable caster or floor glide to the bottom of the appliance, usually by inserting a threaded stem of the caster in the holes that previously received the cap screws.

The above represents a waste of the screws and increases the cost of manufacture. By the present invention the same cap screws that were used to secure the appliance to the pallet may be used to provide adjustable floor glides by the use of a caster or glide of my invention which is attached to the head of the cap screw and results in a considerable savings.

An object of the present invention is to provide a caster that may be assembled onto a bolt or like member.

A further object of the invention is to provide a caster having a large bearing area for attachment to a bolt or like member.

Other objects of the invention will be obvious herefrom and a more complete understanding thereof will be obtained by reference to the accompanying drawing forming a part of the specification, and of which:

Fig. 1 is a top plan view of caster illustrating one embodiment of the invention;

Fig. 2 is a sectional view in elevation taken on lines 2—2 of Fig. 1; and,

Fig. 3 is a perspective view of the caster in use with an adjustable leveling means.

Referring now to the drawings, wherein like elements are designated by like reference characters, the numeral 2, Fig. 3, denotes one embodiment of a caster constructed of a suitable metallic material having inherent resilient properties for use with a threaded adjustable bolt 3 or like member.

More specifically, the caster 2 comprises a shallow, hexagonally shaped body comprising upstanding sides 5, each being integrally connected to a flat or curved base 6, providing a hollow interior 7.

A generally rectangular-shaped tongue 9, of predetermined thickness, Figs. 1 and 2, integrally connected to one of said upstanding sides 5 by a downwardly extending leg 11, is disposed within said hollow interior 7, and is provided with downwardly extending side flanges 12, the edges of which are in closely spaced relation, and may touch the top side 31 of the base 6.

A hexagonal shaped aperture 13, slightly larger than the head of the bolt, is formed within said tongue 9, being in alignment with the center of the base 6.

A retainer plate 15 has an integral connection to the upstanding side 5 of the caster body which is diametrically opposite the side to which tongue 9 is connected. This connection of the retainer plate is provided by an arm 22 which inclines downward and inward from the upper end of that side of the caster body. The retainer plate 15 extends in spaced overlying relation to a substantial portion of the tongue 9, as shown in the drawing.

A U-shaped slot 18, defining spaced arms 19, is formed on the free end of said plate 15, directly over the aperture 13 in flange 9.

Notches 21, are formed on each side of arm 17, adjacent to its respective side 5, thereby providing a region 22 of reduced width about which the attached plate 15 may flex.

The ends 23 of spaced arms 19 extend upward above the horizontal plane of the retainer plate and exterior to the hollow interior 7, the reason therefor being more fully disclosed hereinafter.

The supported structure 4, only one portion of which is shown in Fig. 3, is provided with any well known means (not shown) adapted to threadedly receive the shank 24 of bolt 3 and to permit threaded adjustment thereof.

The caster 2 is assembled onto the bolt 3 by bringing the caster into juxtaposition to the head 25 of bolt 3 in such manner that said head enters into the hollow interior 7 and rests upon the surface of flange 9. The caster is then moved, so that the portion of the shank adjacent the head 25 enters into slot 18 and is embraced by arms 19.

The upwardly extending ends 23 of spaced arms 19 are engaged by the underside 27 of head 25 which tends to flex said plate 15 upward about reduced region 22 against the inherent resiliently of said plate. When the head 25 is directly over and in alignment with the slightly larger and similarly shaped aperture 13, it enters said aperture and comes to rest upon the top surface 31 of base 6 of caster 2 being resiliently retained or captured within said aperture by the downwardly force exerted by arms 19.

The tongue 9 is maintained in predetermined spaced relationship above base 6 by channel members 12, the medial plane of said tongue being midway between the surfaces of head 25 defining the thickness thereof.

The structure 4 may be provided with any number of adjustable supports desired wherein the large base 6 of the caster 2 provides a broad bearing area to support loads applied to the bolt.

The captured bolt 3 is threadingly adjusted, relative to the supported structure 4, by rotating the caster 2, whereby the edges of aperture 13 engage the head 25 and rotate the bolt to its desired position.

The embodiment of the invention as described and illustrated brings forth one particular adaptation thereof for use with bolts or like members having hexagonal shaped heads, and it is obvious that the caster may also be constructed having configurations for other shaped heads.

I claim:

1. A one-piece caster for attachment to a bolt having a shank and a polygonal head, said caster comprising a base portion having a bottom wall and sides extending therefrom, one of said sides having a tongue extending substantially parallel to said bottom wall in overlying relationship thereto, said tongue having a polygonal opening centrally disposed within said base for receiving the polygonal head of said bolt, said tongue having depending sides extending to said bottom wall for spacing said opening a predetermined distance from said bottom wall, and a retainer plate extending from another of said sides in overlying spaced and substantially parallel relationship with said tongue, the free end of said plate having an open slot for receiving the shank of said bolt when the head of said bolt is received within said opening.

2. A one-piece caster for attachment to a bolt having a shank and a polygonal head, said caster comprising a base portion having a bottom wall and sides extending therefrom, one of said sides having a tongue extending substantially parallel to said bottom wall in overlying relationship thereto, said tongue having a polygonal opening centrally disposed within said base for receiving the polygonal head of said bolt, said tongue having depending sides extending to said bottom wall for spacing said opening a predetermined distance from said bottom wall, and a retainer plate extending from another of said sides in overlying spaced and substantially parallel relationship with said tongue, the free end of said plate having an open slot for receiving the shank of said bolt when the head of said bolt is received within said opening, said tongue having a downwardly inclined portion between said one side and said opening, said plate having upwardly inclined arms substantially parallel to said downwardly extending portion, said portion and said arms defining guide means for said head during attachment of said bolt to said caster.

References Cited in the file of this patent

UNITED STATES PATENTS

| | | |
|---|---|---|
| 1,341,133 | Johnson | May 25, 1920 |
| 2,394,729 | Tinnerman | Feb. 12, 1946 |
| 2,577,723 | Groh | Dec. 4, 1951 |
| 2,590,450 | Parsons | Mar. 25, 1952 |
| 2,654,113 | Becker | Oct. 6, 1953 |
| 2,748,906 | Flora | June 5, 1956 |

FOREIGN PATENTS

| | | |
|---|---|---|
| 1,058,460 | France | Mar. 16, 1954 |